Sept. 6, 1932.   P. H. DOWLING   1,875,859
ELECTRICAL RELAY SYSTEM
Filed Jan. 2, 1931

INVENTOR:
P. H. Dowling,
BY A. R. Vencill
His ATTORNEY.

Patented Sept. 6, 1932

1,875,859

UNITED STATES PATENT OFFICE

PHILIP H. DOWLING, OF SWISSVALE, PENNSYLVANIA, ASSIGNOR TO THE UNION SWITCH & SIGNAL COMPANY, OF SWISSVALE, PENNSYLVANIA, A CORPORATION OF PENNSYLVANIA

ELECTRICAL RELAY SYSTEM

Application filed January 2, 1931. Serial No. 506,054.

My invention relates to electrical relay systems, and has for an object the provision of systems of relays interconnected in such a way that the current required to pick up the system is only a few percent, more than the current which will allow it to release.

I will describe several forms of systems embodying my invention, and will then point out the novel features thereof in claims.

Figure 1:
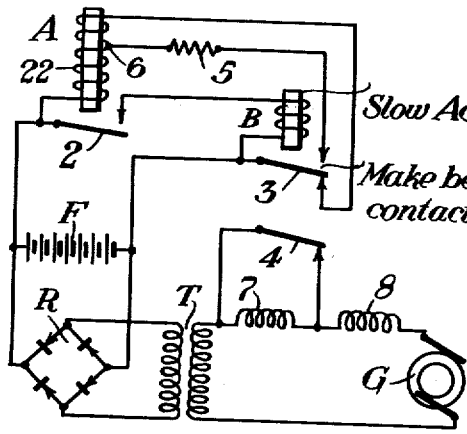
Figure 2:
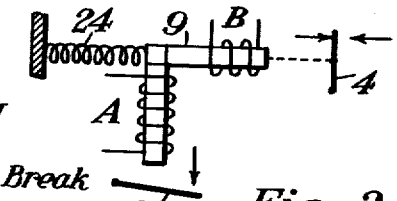
Figure 3:
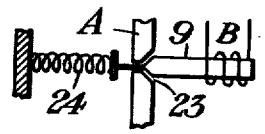
Figure 5:
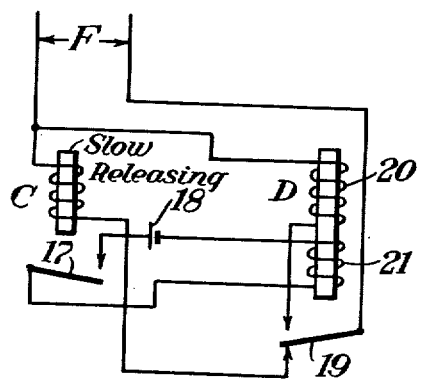
Figure 4:
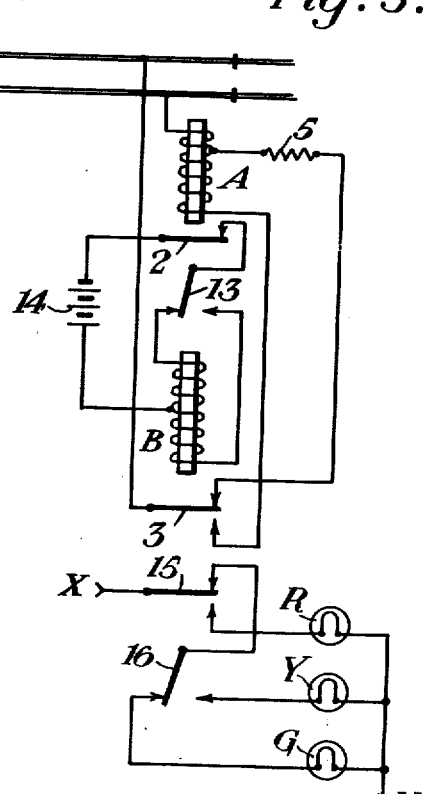

In the accompanying drawing, Fig. 1 is a diagrammatic view showing one form of relay system embodying my invention applied to the automatic control of the charging rate of a storage battery. Figs. 2 and 3 are views showing in side and top elevation, respectively, a modification of a portion of the system shown in Fig. 1. Fig. 4 is a diagrammatic view showing a modified form of relay system embodying my invention applied to a railway signaling track circuit. Fig. 5 is a diagrammatic view showing another form of relay system embodying my invention.

Similar reference characters refer to similar parts in each of the views.

Referring first to Fig. 1, the reference character F designates a storage battery which is connected with a load that is not shown in the drawing. This battery is charged from a source of alternating current G, through a transformer T and a rectifier R, although the regulating apparatus might equally well be applied to a direct current charging circuit. The primary circuit of the transformer T includes the usual ballast impedance 8 and a regulating impedance 7. The voltage applied to the battery F by the rectifier R is poorly regulated, so that as the charge in the battery increases, the voltage across its terminals will increase, and as the battery discharges, this voltage will fall off. This change in voltage operates a relay system, which, as here shown, comprises two relays A and B. When relay B is released, the entire operating winding 22 of relay A is connected across the terminals of battery F through the back point of contact 3 of relay B. When relay B is closed, however, the right-hand terminal of battery F is connected with an intermediate point 6 in the winding 22 of relay A through a resistance 5, so that then only a portion of winding 22 is connected across battery F. The winding of relay B is connected across battery F through a front contact 2 of relay A. When relay B is released, the regulating impedance 7 is placed on short circuit by back contact 4, whereas when relay B is picked up, this short circuit is removed and the impedance 7 reduces the rate of charge of the battery F.

The operation of the apparatus shown in Fig. 1, is as follows: As shown in the drawing, relays A and B are both released, so that the low resistance shunt around impedance 7 is closed, and the battery F is being charged at a relatively high rate. When the battery becomes fully charged, the voltage across its terminals will reach the pick-up voltage of relay A, so that the armature of this relay will close, thereby closing front contact 2. This will cause relay B to become energized, thereby opening contact 4 and so reducing the charging rate of battery F. Only a portion of the winding 22 of relay A will then be connected across battery F, and this portion, as well as the value of resistance 5, are so chosen that the release voltage of relay A will then be very slightly below the fully charged voltage of battery F. It follows that when the charge in battery F drops to a given value, relay A will release, thereby releasing relay B, with the result that the charging rate will again be increased.

Relay A should have definite pick-up and release characteristics, and contact 2 should be so designed that it remains closed until the armature has dropped well away from the pole pieces of the core, so that when contact 2 opens, the armature will have considerable downward velocity, thereby minimizing the stuttering of the armature and the burning of the contact members. The ratio of pick-up to release of relay B is in itself of no importance. The requirements for relay B are merely that it should pick up positively when contact 2 closes, should release when contact 2 opens, and should be slow-acting. Contact 3 should be so designed that its back point remains closed until its front point closes when the relay becomes energized.

The essence of the system shown in Fig. 1 lies in the auxiliary circuit for relay A which is closed when relay B is closed. This circuit must be so designed that the ampere turns in the winding of relay A are such that this relay will release at a voltage only a few per cent. below the voltage at which the relay picks up when its entire winding is connected across battery F.

Referring now to Figs. 2 and 3, I have here shown one form of apparatus wherein relays A and B are combined so that the movable member of relay B affects the magnetic circuit of relay A. The magnetic circuit for relay A is provided with an air gap 23 which is at times closed by a plunger 9 constituting the movable member of relay B. When relay A is deenergized, relay B is also deenergized and the plunger 9 is then drawn by a spring 24 into such position that it substantially closes the air gap 23, with the result that the reluctance of the magnetic circuit of relay A is low. When relay A becomes effectively energized, relay B will also become energized and will withdraw the plunger 9 from the air gap 23, thereby increasing the reluctance of relay A and so increasing the voltage at which relay A will release. The parts may be so designed that the release voltage of relay A will be only a few per cent. below the pick-up voltage. The circuits for the apparatus shown in Figs. 2 and 3 will be the same as those shown in Fig. 1, except that the circuit for winding 22 of relay A does not need to be controlled by relay B.

Referring now to Fig. 4, the reference character 12 designates a railway track circuit, the rails of which are supplied with current from a battery 10 through a pole-changer 11. Relays A and B in this view are of the polarized type, each having a neutral armature and a polar armature. When relay B is deenergized, the entire winding of relay A is connected across the track rails through the back point of neutral contact 3 of relay B. When relay B is energized, however, only a portion of the winding of relay A is connected across the track rails through the front point of contact 3 and a resistance 5. When relay A is energized in the normal direction, relay B is also energized in the normal direction from a battery 14 through front neutral contact 2 of relay A and polar contact 13 of relay A in the left-hand position. When relay A is energized in the reverse direction, relay B is also energized in the reverse direction through front neutral contact 2 and polar contact 13 in the right-hand position. Neutral contact 15 and polar contact 16 of relay B may be used to control signal lamps R, Y and G in the usual and well known manner.

When track section 12 is occupied by a train, relays A and B will both be deenergized, so that the entire winding of relay A will be connected across the rails. When the train leaves the section, relay A will pick up, and will thereby energize relay B, with the result that only a portion of the winding of relay A will then be connected across the rails. This will increase the voltage at which relay A will release, so that when section 12 again becomes occupied, this relay will release more positively than if its entire winding were connected across the rails. In other words, the ratio between the release and pick-up values of relay A is relatively very high.

Referring now to Fig. 5, the reference character C designates an ordinary relay of the direct current type, whereas D is a direct current relay having two operating windings 20 and 21. When relay D is deenergized, the winding of relay C is connected with a variable source of current F, and both windings 20 and 21 of relay D are deenergized. When the voltage of the source F rises to the pick-up voltage of relay C, the armature of this relay will close, whereupon winding 21 of relay D will become energized from a local battery 18 through front contact 17 of relay C. This will cause the armature of relay D to close, thereby opening the circuit for relay C at the back point of contact 19 and connecting winding 20 with the source F through the front point of contact 19. Relay C will then release and so will deenergize winding 21 of relay D. Relay D is so designed that when it is energized by winding 20, its release voltage is only slightly lower than the pick-up voltage of relay C. It follows that when the voltage of F drops to a value slightly below the pick-up voltage of relay C, relay D will release. In the form of apparatus shown in Fig. 5, then, the desired ratio between release and pick-up values is accomplished by transferring the control from relay C to relay D after relay C has become effectively energized. Relay C should have slow-releasing characteristics, but relay D should be quick to pick up and quick to release.

Although I have herein shown and described only a few forms of apparatus embodying my invention, it is understood that various changes and modifications may be made therein within the scope of the appended claims without departing from the spirit and scope of my invention.

Having thus described my invention, what I claim is:

1. In combination, a source of current, a load connected with said source, two relays A and B, means for connecting the entire winding of relay A across the terminals of said load through a back contact of relay B, means for connecting only a portion of the winding of relay A across the terminals of said load through a front contact of relay B, means for energizing relay B when and only when the armature of relay A is closed, and means controlled by relay B for varying the current supplied to said load by said source.

2. In combination, a source of current, a storage battery connected with said source, two relays A and B, means for connecting the entire winding of relay A across said battery through a back contact of relay B, means for connecting only a portion of the winding of relay A across said battery through a front contact of relay B, means for energizing relay B when and only when the armature of relay A is closed, and means for increasing the curent supplied to said battery by said source when relay B is energized.

3. In combination, a source of current, a load connected therewith, two relays A and B, a circuit for the winding of relay A connected across said load, means for energizing relay B when and only when the armature of relay A is closed, means operating when relay B is energized to increase the reluctance of the magnetic circuit for relay A and thereby increase the voltage at which relay A will release, and means controlled by relay B for varying the amount of current supplied to said load by said source.

4. In combination, a source of current, a load connected therewith, two relays A and B, a circuit for the winding of relay A connected across said load, means for energizing relay B when and only when the armature of relay A is closed, means operating when relay B is energized to increase the voltage at which relay A will release, and means controlled by relay B for varying the amount of current supplied to said load by said course.

5. In combination, a section of railway track, a source of current connected across the rails of said section, two relays A and B, means for connecting the entire winding of relay A across the rails of said section through a back contact of relay B, means for connecting only a portion of the winding of relay A across the rails of said section through a front contact of relays B, means for energizing relay B when and only when the armature of relay A is closed and traffic governing means controlled by relay B.

6. In combination, a section of railway track, a source of current reversibly connected with the rails of said section, two polarized relays A and B, means for connecting the entire winding of relay A across the rails of said section through a neutral back contact of relay B, means for connecting only a portion of the winding of relay A across the rails of said section through a neutral front contact of relay B, means operating when relay A is closed in normal or reverse direction to energize relay B in normal or reverse direction, and traffic governing means controlled by relay B.

7. In combination, a relay, a circuit including the operating winding of said relay, and means responding to the closing of the armature of said relay to cut a portion of said winding out of said circuit and thereby increase the voltage at which the armature will release.

8. In combination, a relay, a circuit having two branches the first of which includes the entire operating winding of said relay and the second of which includes a part only of said winding, and means for closing the first or the second of said branches according as the armature of said relay is open or closed.

9. In combination, two relays A and B, means for energizing or deenergizing relay B according as the armature of relay A is closed or open, a circuit including the operating winding of relay A, and means operating when relay B is energized to cut a portion of the winding of relay A out of said circuit.

10. In combination, two relays A and B, means for energizing or deenergizing relay B according as the armature of relay A is closed or open, a circuit having two branches one of which includes the entire operating winding of relay A and the other of which includes only a portion of such winding, and means for closing the first or the second of said branches according as relay B is deenergized or energized.

In testimony whereof I affix my signature.

PHILIP H. DOWLING.

DISCLAIMER 1,875,859.—*Philip H. Dowling*, Swissvale, Pa. ELECTRICAL RELAY SYSTEM. Patent dated September 6, 1932. Disclaimer filed May 18, 1935, by the assignee, *The Union Switch & Signal Company.*

Hereby enters the following disclaimer, to wit:

Your petitioner hereby disclaims the subject matter of claims 5, 7, 8, 9, and 10.

[*Official Gazette June 11, 1935.*]